United States Patent [19]

Inoyama et al.

[11] 4,179,783

[45] Dec. 25, 1979

[54] HOLDING APPARATUS WITH ELASTIC MECHANISM

[75] Inventors: Tadao Inoyama, Yokohama; Yasuhide Matsumura, Hachioji; Yukio Nagano, Chiba, all of Japan

[73] Assignee: Hitachi, Ltd., Japan

[21] Appl. No.: 834,897

[22] Filed: Sep. 20, 1977

Related U.S. Application Data

[63] Continuation of Ser. No. 640,702, Dec. 15, 1975, abandoned.

[30] Foreign Application Priority Data

Dec. 16, 1974 [JP] Japan ................................ 49/143413

[51] Int. Cl.² ............................................. B25B 27/14
[52] U.S. Cl. .................................................. 29/281.5
[58] Field of Search ...................... 29/281.5, 759, 714, 29/23, 407

[56] References Cited

U.S. PATENT DOCUMENTS

| | | | |
|---|---|---|---|
| 2,893,217 | 7/1975 | Edmond | 29/407 |
| 3,526,943 | 9/1970 | Erhardt | 29/243.56 |
| 3,824,674 | 7/1974 | Inoyama et al. | 29/407 |
| 3,965,562 | 6/1976 | Inoyama | 29/407 |
| 4,048,687 | 9/1977 | Kato et al. | 29/407 |

Primary Examiner—James L. Jones, Jr.
Attorney, Agent, or Firm—Craig and Antonelli

[57] ABSTRACT

A holding apparatus coupled to a drive shaft provides a holding mechanism. An elastic mechanism coupling the holding mechanism to the drive shaft and detectors for detecting a deflection of the holding mechanism with respect to the drive shaft. The holding mechanism holds a first member which is assembled to a second member and is controlled in response to a representative signal generated by the detectors. The elastic mechanism comprises two independent springs, one of which supports elastically the holding mechanism in the axial direction of the shaft and the other of which supports elastically the holding mechanism in the direction perpendicular to the axial direction thereof, whereby the holding mechanism is movably coupled with the drive shaft.

18 Claims, 6 Drawing Figures

HOLDING APPARATUS WITH ELASTIC MECHANISM

This is a continuation of application Ser. No. 640,702 filed Dec. 15, 1975 now abandoned.

BACKGROUND OF THE INVENTION

This invention relates to a holding apparatus, in which a holding mechanism is movably supported by an elastic mechanism and, more particularly, to an apparatus for holding a first member, which is coupled to a positioning mechanism for assembling the first and a second members.

An automatic assembly system for automatically assembling a first member such as a piston and a second member such as a cylinder has been proposed in U.S. Pat. No. 3,824,674, in which various holding apparatus have been described. All those holding apparatus provide springs placed parallel to a center axis of a drive shaft, which is coupled with a holding mechanism through springs, so as to detect a displacement or a deflection of the holding mechanism from the drive shaft, even if a small force in comparison with a total weight of the holding apparatus and a first member held thereby is effected to the first member. In a case that the first member, however, is relatively heavy in weight, the springs must be large in size and in elastic modulus. Accordingly, if a sensitivity of a detector for the displacement or the deflection is constant, the springs must be longer in length in order to produce a minimum value of the displacement or the deflection which the detector can detect, so that the holding apparatus may become large and may not be sensitive in its operation, whereas if the springs are constant in size and in elastic modulus, a detector having high sensitivity is required so that the holding apparatus may have a high cost. Further, it is more difficult to insert the piston into the cylinder when the springs become large in size and in elastic mechanism.

SUMMARY OF THE INVENTION

An object of this invention is to provide a holding apparatus being compact, in which detectors for displacement or deflection are not needed with a high sensitivity.

Another object of this invention is to provide a holding apparatus being sensitive in its operation.

In order to achieve the above objects, a holding apparatus of this invention provides a holding mechanism which assembles a first member held by the holding apparatus and a second member held by others. The holding mechanism is coupled with a drive shaft through the elastic mechanism which comprises at least two independent springs, one of which movably supports the holding mechanism in the axial direction of the drive shaft and the other of which movably supports the holding mechanism in a different direction from the axial direction thereof, whereby the holding mechanism is movably coupled with the drive shaft.

The above and other objects, features and advantages of this invention will become more apparent from the following description in connection with the accompanying drawings.

DESCRIPTION OF THE PREFERRED EMBODIMENTS

Figure 1:
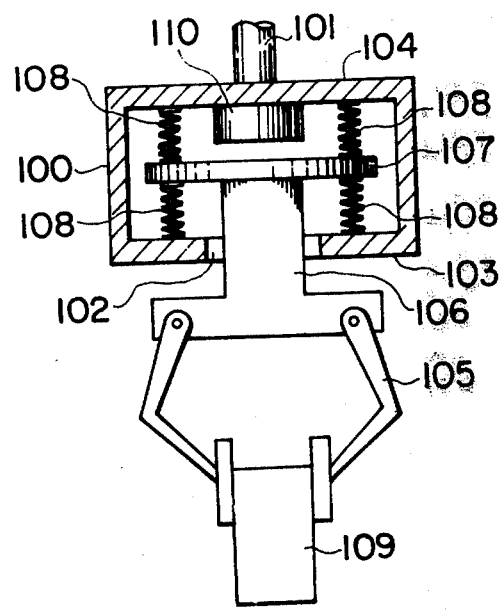
FIG. 1 is a sectional view of a conventional holding apparatus.
Figure 2:
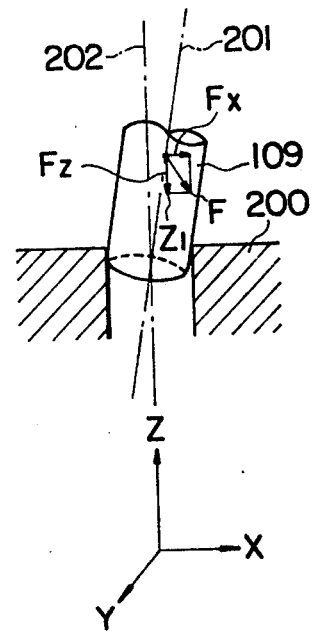
FIG. 2 is a diagram for explaining a principle of this invention.

Referring now to FIG. 1, a casing 100 with an opening 102 which is provided on the lower wall 103 thereof, is securely fixed to a drive shaft 101 through an upper wall 104 of the casing 100. Arms 105 of a holding mechanism are pivoted to a member 106 which is fixed to a supporting plate 107 suspended by the upper and the lower walls 104 and 103 of the casing through springs 108. The arms 105 hold a first member 109 such as a piston which is assembled to a second member such as a cylinder. A detector 110 for detecting displacement or deflection of the supporting plate 107 with respect to the drive shaft 101 is provided at a position being apart from and facing to the supporting plate 107 in the casing 100. In the above conventional holding apparatus, the reason why it becomes difficult to insert the piston into the cylinder when the springs 108 become large in size and in elastic modulus, will be explained in connection with FIG. 2. In a positioning mechanism for assembling the piston 109 and the cylinder 200, it is very difficult for the center axis 201 of the piston 109 to be placed in coincidence with the center axis 202 of the cylinder 200. So, in this status as shown in FIG. 2, it is necessary to insert the piston 109 into the cylinder 200. In this case, whether or not the piston 109 can be inserted into the cylinder 200 depends on the direction of a force F applied to the piston 109, wherein the piston 109 can be inserted easier to the cylinder 200 when the direction of the force F gets nearer to the direction $Z_1$ which is equal to the axial direction of the cylinder 200. When the holding apparatus holds the heavy piston, for instance, the springs 108 having a large elastic modulus are designed, so that a large force is necessarily needed in order that the supporting plate 107 is deviated in the X- or Y- directions of X-, Y- and Z- coordinates shown in FIG. 2. Accordingly, the component $F_X$ of the force F increases in comparison with the component $F_Z$ thereof, where the component $F_Z$ is of the Z- direction and the component $F_X$ is of the direction perpendicular to the Z direction. As a result, the direction of the force F is deflected from the $Z_1$ direction.

A principle of this invention is to use two kinds of springs, one of which is different in elastic modulus from the other, so that the component $F_X$ of the Force F applied to the piston 109 can be small in comparison with the component $F_Z$ thereof. Namely, the interference between the springs is decreased.

Figure 3:
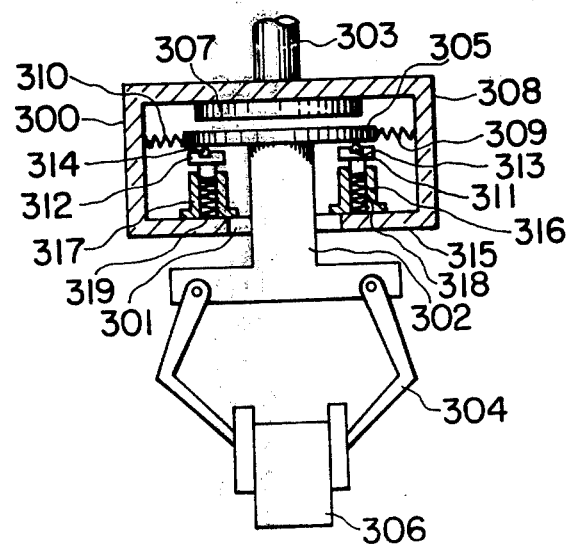
FIG. 3 is a schematic sectional view of an embodiment of this invention.

Referring to FIG. 3, a casing 300 with an opening 301 through which a member 302 is inserted into the casing 300, is securely fixed to a drive shaft 303. Arms 304 of a holding mechanism are pivoted to the member 302 which is fixed to a supporting plate 305. The arms 304 hold a first member 306 such as a piston which is to be assembled to a second member such as a cylinder. A detector 307 for detecting displacement or deflection of the supporting plate 305 from the drive shaft 303 is provided at a position being spaced from and facing to the supporting plate 305 in the casing 300. The supporting plate 305 is movably supported by side wall portion 308 of the casing 300 through springs 309 and 310, and sliders 311 and 312 through bearings 313 and 314, whereby the supporting plate 305 can be movable in the direction perpendicular to the axial direction of the drive shaft 303. The strength of the springs 309 and 310 may be so designed that the supporting plate 305 is shifted to the center position against a friction force due to the bearings 313 and 314 when the assembling operation for the piston and the cylinder has finished. In addition, the sliders 311 and 312 are placed on lower wall 315 through cylinders 316 and 317, and are supported by springs 318 and 319, whereby the supporting plate 305 can be movable in the axial direction of the drive shaft 303. Although the two pairs of springs 309 and 310, and 318 and 319 placed on the X- and Z- coordinates plane are shown in FIG. 3, it is needless to say that the respective pair of springs (not shown) can be placed on the Y- and Z- coordinates plane.

In the instant embodiment, the four springs arranged at right angles with respect to the axial direction of the drive shaft 303 and the four springs arranged parallel with the axial direction of the drive shaft 303 have been described, but this invention is not limited to these arrangements. Three springs, for instance, may be utilized in order to movably support the supporting plate 305 in the direction perpendicular to the axial direction of the drive shaft 303, each of which is placed on a position shifted by 120° from each other, as well as three springs, for instance may be utilized in order to movably support the supporting plate 305 in the axial direction of the drive shaft 303.

Figure 4:
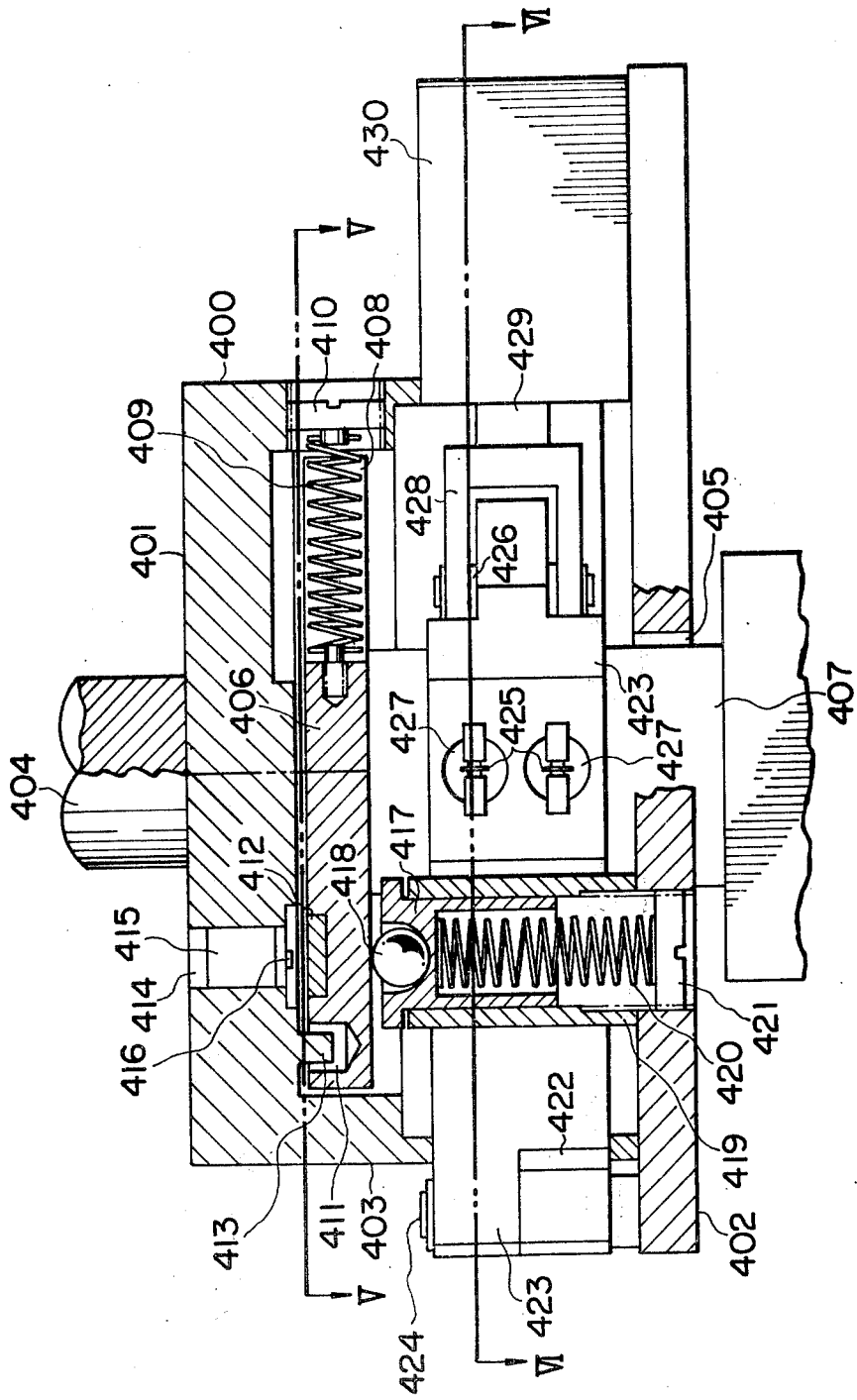
FIG. 4 is an enlarged sectional view in a main portion of an embodiment of this invention.
Figure 5:
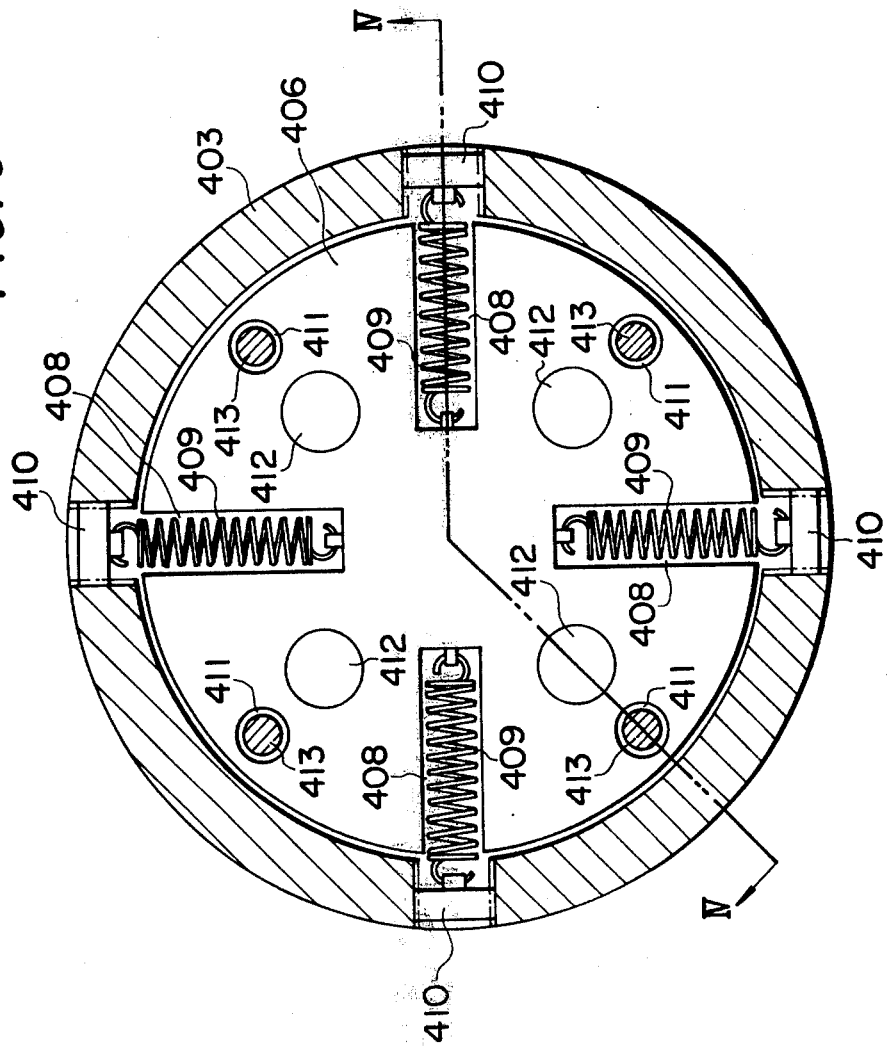
FIGS. 5 and 6 are sectional views taken along respective lines V—V and VI—VI shown in FIG. 4.
Figure 6:
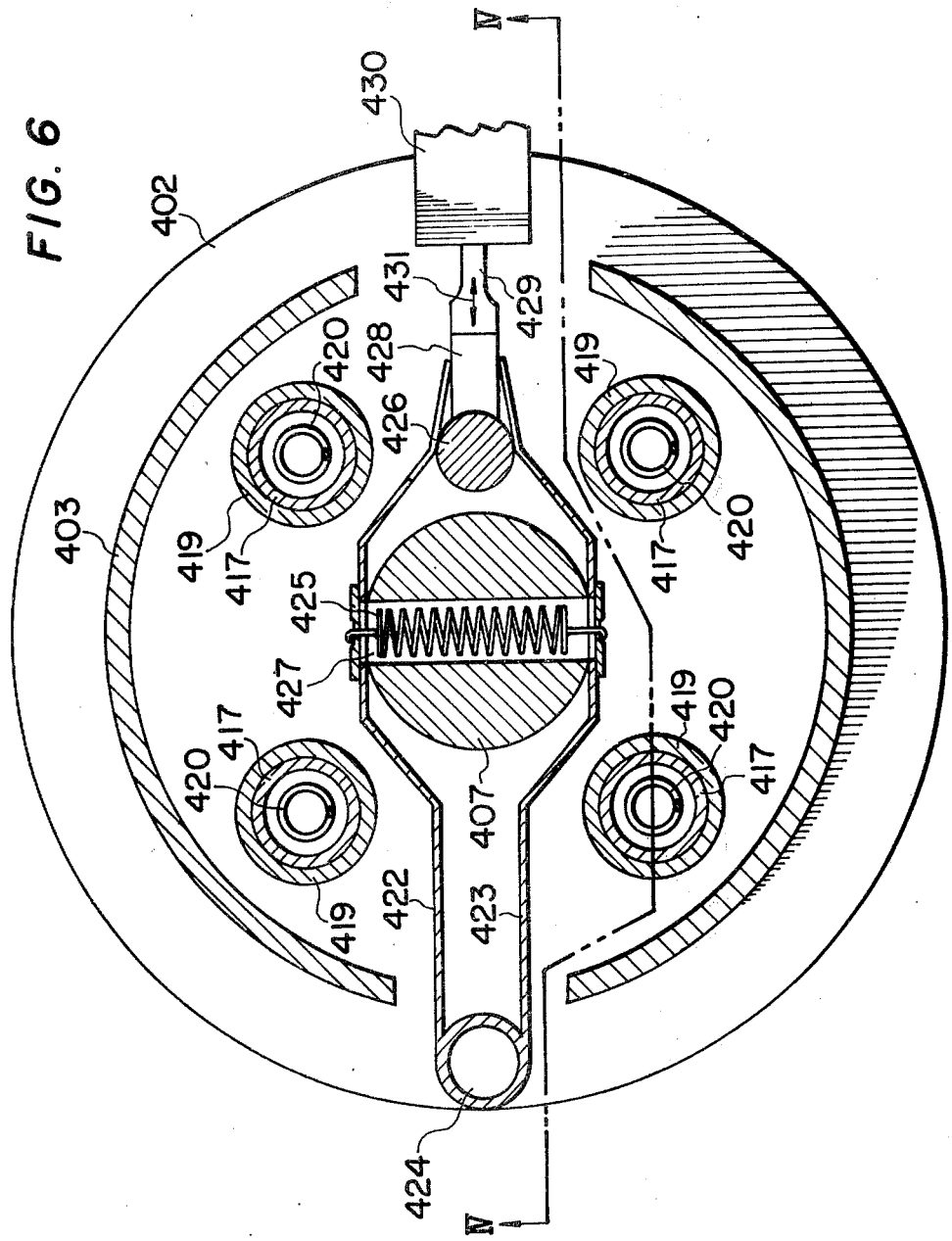

Referring now to FIGS. 4, 5 and 6, the construction of the holding apparatus of this invention will be explained in more detail. For easy understanding, the sectional view taken along lines IV—IV of FIGS. 5 and 6 is shown in FIG. 4. A casing 400 comprises an upper wall 401, a lower wall 402 with an opening 405 and a side wall 403. A drive shaft 404 is securely fixed to the upper wall 401 of the casing 400. A supporting plate 406 is securely fixed to a member 407 which is connected with a holding mechanism and is inserted into the casing 400 through the opening 405. The supporting plate 406 provides four cut portions 408 as shown in FIG. 5. Four coil springs 409 are placed in the cut portions 408, respectively, each of which is connected at one end thereof with the supporting plate therein. The respective other ends of the springs 409 are connected to respective screws 410 provided within the side wall 403 in order to adjust the strength of the springs 409, whereby the supporting plate 406 can be movable in the direction perpendicular to the axial direction of the drive shaft 404, the center axis of which is placed in registration with the center axis thereof. Further, the supporting plate 406 provides hole portions 411 and pieces 412 such as iron embeded therein. Detectors 414 for detecting the deflection of the supporting plate 406 from the drive shaft 404 are placed in the upper wall 401 and at the each position corresponding to the each piece 412, each of which comprises a permanent magnet 415 and a Hall element 416 such as a conventional Hall detector. The deflection of the supporting plate 406 is detected by the change of the magnetic flux through the Hall element 416 when the gap between the supporting plate 406 and the Hall element 416 is changed.

The combination of each hole portion 411 and each projection 413 placed on the inner surface of the upper wall 401 operates to prevent the supporting plate 406 from deflecting over the predetermined deflection which depends on the sensitivity of the detector 414. In this embodiment, the gap between the hole portion 411 and the projection 413 is a range of 1.0~1.5 mm.

The supporting plate 406 is supported by sliders 417 through bearings 418. The respective sliders 417 are coupled with respective cylinders 419 placed on the lower wall 402 in such a manner that each slider 417 can be slid in each cylinder, and are supported by respective coil springs 420 which are coupled with respective screws 421, whereby the supporting plate 406 can be movable in the axial direction of the drive shaft 404. Each screw 421 is provided within the lower wall 402 in order to adjust the strength of the respective springs 420.

A clamping mechanism comprises plate members 422 and 423 coupled with a shaft 424 which is fixed on the lower wall 402, such as a hinge, coil springs 425 and a rod 426. Both ends of the coil springs 425 are connected with the plate members 422 and 423 through an opening 427 which is provided in the member 407 so that the plate members 422 and 423 are pressed against the member 407 with a predetermined pressure. The rod 426 is connected with a piston 429 through a joint 428, which is moved by an actuator 430 such as an air cylinder in the direction shown by an arrow mark 431. When the rod 426 is moved to the left, the member 407 is locked by the plate members 422 and 423 since they are pressed against the member 407. When the rod 426 is moved to the right, the member 407 becomes free from the plate members 422 and 423, since the distance between the plate members 422 and 423 is extended by the rod 426. The clamping mechanism is used in cases where the holding apparatus holds a first member such as a piston and positions it to a predetermined position, etc., except the assembling operation. In the above embodiment, the cylinders 419 fixed on the lower wall 402 have been explained, but, the cylinders 419 fixed on the supporting plate 406 may be so constructed that it is coupled to the lower wall 402 through the sliders 417 and the bearings 418.

While only a few forms of this invention have been shown and described, many modifications will be apparent to those skilled in the art within the spirit and scope of this invention as set forth in the appended claims.

We claim:
1. A holding apparatus comprising:
   (a) a holding mechanism for holding an assembly member;
   (b) a drive shaft and support means fixed to said drive shaft for resiliently supporting said holding mechanism, said support means including:
   supporting structure,
   axial coupling means for resiliently coupling said holding mechanism to said supporting structure in the axial direction of said drive shaft,
   transverse coupling means including resilient means for resiliently coupling said holding mechanism to said supporting structure in a direction transverse to said axial direction,
   first resilient means forming part of said axial coupling for enabling resilient displacement of said holding mechanism, and
   second means, forming part of said axial coupling between said holding mechanism and said first means, for minimizing operational interference between said transverse coupling and said first means; and (c) detector means provided on said support means for detecting deflection of said holding mechanism relative to said drive shaft.

2. A holding apparatus comprising:

a holding mechanism, a drive shaft, first means fixed to said drive shaft for moving said holding mechanism which holds an assembly member, said first means being provided with:

first springs resiliently coupled to said holding mechanism wherein said holding mechanism may be moved perpendicularly to the axial direction of said drive shaft, second means connected to supporting structure and comprising bearing means for slidably carrying said holding mechanism for said perpendicular movement, and second springs for resiliently supporting said holding mechanism and said bearing means for movement in said axial direction of said drive shaft, said bearing means being coupled to said second springs for minimizing operational interference between said first and second springs; and detector means provided on said first means for detecting deflections of said holding mechanism relative to said drive shaft.

3. A holding apparatus according to claim 1, wherein said second means comprises means including a plurality of bearings for slidably supporting said holding mechanism, said means being operatively connected to said first means.

4. A holding apparatus according to claim 1, wherein said first means comprises a plurality of first springs, each of which is placed between said holding mechanism and said supporting structure, and said transverse coupling means comprises a plurality of second springs, each of which is connected to said supporting structure at one end of said second springs and to said holding mechanism at the other end of said second springs.

5. A holding apparatus according to claim 4, wherein said first springs are arranged in a direction parallel to the axial direction of said drive shaft, and said second springs are arranged in a direction perpendicular to the axial direction of said drive shaft.

6. A holding apparatus according to claim 5, wherein said first and second springs are each at least three springs, respectively, each of said three springs being separated from neighboring springs by an equal angular distance.

7. A holding apparatus according to claim 6, comprising means for adjusting the strength of said each spring, said means for adjusting being coupled between said each spring and said supporting structure.

8. A holding apparatus according to claim 6, wherein each of said three springs are arranged at a position separated by 120° from the neighboring springs.

9. A holding apparatus according to claim 5, wherein said second means comprises means including a plurality of bearings for slidably supporting said holding mechanism, said means being operatively connected to said first means.

10. A holding apparatus according to claim 5, wherein further means are included for preventing said holding mechanism from deflecting over a predetermined deflection, said further means comprising a combination of a hole portion placed in said holding mechanism and a projection placed on said first means.

11. A holding apparatus according to claim 4, wherein said second means comprises means including a plurality of bearings for slidably supporting said holding mechanism, said means being operatively connected to said first means.

12. A holding apparatus according to claim 1, wherein other means are included for locking said holding mechanism, said other means comprising two plate members which are so constructed that they are pressed against said holding mechanism with a predetermined pressure, and a rod placed between said two plate members and moved by an actuator.

13. A holding apparatus according to claim 2, wherein said first springs are each connected to said supporting structure at one end of said first springs and to said holding mechanism at the other end of said first springs.

14. A holding apparatus according to claim 13, wherein said first and second springs are each at least three springs, respectively, each of said three springs being separated from neighboring springs by an equiangular distance.

15. A holding apparatus according to claim 14, wherein means are included for adjusting the strength of said each spring, said means being coupled between said each spring and said supporting structure.

16. A holding apparatus according to claim 14, wherein each of said three springs are arranged at a position separated by 120° from neighboring springs.

17. A holding apparatus according to claim 2, wherein further means are included for preventing said holding mechanism from deflecting over a predetermined deflection, said further means comprising a combination of a hole portion placed in said holding mechanism and a projection placed on said first means.

18. A holding apparatus according to claim 2, wherein other means are included for locking said holding mechanism, said other means comprising two plate members which are so constructed that they are pressed against said holding mechanism with a predetermined pressure, and a rod placed between said two plate members moved by an actuator.

* * * * *